US007769268B2

(12) United States Patent
Tsang et al.

(10) Patent No.: US 7,769,268 B2
(45) Date of Patent: Aug. 3, 2010

(54) METHOD AND APPARATUS FOR CD FORMAT DECISION

(75) Inventors: Wing Hon Tsang, North Point (HK); Matthew Au, Shatin (HK); Yun Fai Lee, Tuen Mun (HK)

(73) Assignee: Thomson Licensing, Boulogne Billancourt (FR)

( * ) Notice: Subject to any disclaimer, the term of this patent is extended or adjusted under 35 U.S.C. 154(b) by 1949 days.

(21) Appl. No.: 10/627,800

(22) Filed: Jul. 25, 2003

(65) Prior Publication Data
US 2005/0074228 A1 Apr. 7, 2005

(30) Foreign Application Priority Data
Aug. 16, 2002 (EP) .................................. 02292055

(51) Int. Cl.
*H04N 5/91* (2006.01)
*H04N 7/00* (2006.01)
(52) U.S. Cl. .............................. 386/46; 386/96; 386/125
(58) Field of Classification Search .................. 386/96, 386/125, 46
See application file for complete search history.

(56) References Cited
U.S. PATENT DOCUMENTS

| 5,701,384 | A | | 12/1997 | Park | |
|---|---|---|---|---|---|
| 5,778,257 | A | * | 7/1998 | Tsukatani et al. | 710/74 |
| 6,388,960 | B1 | * | 5/2002 | Furukawa et al. | 369/30.24 |
| 7,050,376 | B2 | * | 5/2006 | Han et al. | 369/53.2 |
| 7,154,822 | B2 | * | 12/2006 | Higashi | 369/47.13 |
| 7,184,380 | B2 | * | 2/2007 | Momose | 369/59.13 |
| 2002/0101790 | A1 | * | 8/2002 | Miyashita et al. | 369/30.07 |
| 2003/0091338 | A1 | * | 5/2003 | Snow et al. | 386/96 |
| 2003/0142604 | A1 | * | 7/2003 | Nakamura | 369/53.22 |

FOREIGN PATENT DOCUMENTS

| EP | 0453108 | 10/1991 |
|---|---|---|
| EP | 0724263 | 7/1996 |
| JP | 08-088829 | 2/1996 |
| WO | WO 02/075737 A1 | 9/2002 |

OTHER PUBLICATIONS

Search Report for European Patent Appln. No. 02292055.7 dated Mar. 6, 2003.

* cited by examiner

*Primary Examiner*—Thai Tran
*Assistant Examiner*—Girumsew Wendmagegn
(74) *Attorney, Agent, or Firm*—Robert D Shedd; Patricia Verlangieri

(57) ABSTRACT

The present invention relates to a method for determining the format of an optical recording medium (1) comprising one or more data, audio and/or video tracks in one or more sessions, and an apparatus for reading from and/or writing to optical recording media (1) using such method.

It is an object of the present invention to propose a method for determining the format of an optical recording medium (1), which is robust against partially incorrect data on the recording medium (1).

This object is achieved by a method comprising the steps of:
  reading (101) the table of contents (TOC) of a first session of the recording medium (1);
  checking (102, 103, 32) whether more than one track is present in the first session and/or whether at least one track is indicated as being an audio track in the table of contents (TOC); and
  determining (104, 36) the format of the recording medium (1) to be audio if at least one of the checking steps (102, 103, 32) yields a positive result, and determining (105, 35) the format to be data else.

12 Claims, 5 Drawing Sheets

Fig. 1

| Fields of Q sub-channel | | Bit used | Value in Lead-in TOC | Description and value (other possible values) | | | | |
|---|---|---|---|---|---|---|---|---|
| S0 | | 1 | | Synchronization pattern for each Q data frame | | | | |
| S1 | | 1 | | | | | | |
| CONTROL | | 4 | | The definitions of bit combinations are<br>0 0 x 0: Without pre-emphasis stereo audio<br>0 0 x 1: Pre-emphasis stereo audio<br>0 x 0 x: Copy prohibited<br>0 x 1 x: Copy permitted<br>0 1 x 0: Digital data<br>1 x x x: Broadcasting use<br><br>Remark: 'x' means of no relevance | | | | |
| ADR | | 4 | 1 | Mode for DATA-Q (2, 3, 5) | | | | |
| DATA-Q | TNO | 8 | 00 | 00: Lead-in area. (01 to 99: Track No. in program area. AA: Lead-out area) | | | | |
| | POINT | 8 | | Track No. (01-99) | A0 | A1 | A2 | Others (B0, C0) |
| | MIN | 8 | x | | | | | |
| | SEC | 8 | x | | | | | |
| | FRAME | 8 | x | | | | | |
| | ZERO | 8 | 00 | | | | | |
| | PMIN | 8 | | The starting MSF of the track pointed to by POINT | 1st Track No. | Last Track No. | The starting MSF of the lead-out area | The start MSF of next program area session |
| | PSEC | 8 | | | 00 (10, 20) | 00 | | |
| | PFRAME | 8 | | | 00 | 00 | | |
| CRC | | 16 | | 16-bit CRC for CONTROL, ADR, and DATA-Q | | | | |

METHOD AND APPARATUS FOR CD FORMAT DECISION

FIELD OF THE INVENTION

The present invention relates to a method for determining the format of an optical recording medium comprising one or more data and/or audio and/or video tracks, and an apparatus for reading from and/or writing to optical recording media using such method.

BACKGROUND OF THE INVENTION

A common optical recording medium is the well-known compact disc (CD). Over the years CD format has evolved from the initial CDDA audio format (Red Book) to a whole family of formats covering different audio, video, and data applications. Some of these formats support a mixture of CDDA format and a variety of data and video formats on the same disc. Examples for such formats are Mixed-mode CD, CD Extra, and VCD.

Format Definitions:

CDDA:

CDDA format is the so-called compact disc (audio CD) and is specified in the IEC 908 standard (known as Red Book format).

CD-ROM/CD-ROM-XA:

The CD-ROM/CD-ROM-XA format describes the extension of CD to store computer data (known as Yellow Book format).

Mix-Mode:

Mix-mode format comprises a combination of CDDA and CD-ROM/CD-ROM-XA tracks, usually one data track (files) plus up to 98 audio tracks.

AVCD:

The Audio Video CD comprises an ISO9660 track (file system) plus a video track plus CDDA tracks.

CD Extra/CD Plus/Enhanced CD:

These discs contain a first session comprising CDDA and a second session comprising data. The format is defined in the Blue Book.

VCD—Movie:

The Video CD (Movie) comprises an ISO9660 track (file system) plus a video track. The format is defined in the White Book.

VCD—Karaoke:

The Video CD (Karaoke) comprises an ISO9660 track (file system) plus a video track. The format is defined in the White Book.

While copying of audio CDs was only a minor problem for a long time, the recent availability of inexpensive recording equipment and media has made unauthorised copying of audio CDs a major issue for the music industry. Therefore, a number of copy protection mechanisms have been introduced. The copy protection mechanisms shall prevent copying audio CDs using a CD-ROM drive of a personal computer. Copy protected discs will disturb the CD-ROM drive if it tries to copy the digital data format directly. Furthermore, depending on the copy protection mechanism, it will also cause playback problems. However, the copy-protected discs must not cause any side effect or degrade the quality of the audio tracks if the disc is played back with a standard audio CD player. The copy protection mechanism may, therefore, not violate the CD Red Book standard too much and exceed the tolerances of a standard audio CD player.

However, caused by the large number of different disc formats, many multi-format disc players are available on the market. In addition, due to the increasing success of compressed audio formats like MP3, there is a growing demand for disc players capable of playing back compressed audio files. For the above reasons many current disc players are equipped with CD-ROM drives rather than standard audio CD drives as used in older audio CD players. These disc players are confronted with severe problems upon attempting the legitimate playback of copy-protected audio CDs.

Known copy protection mechanisms can be classified into five categories, which are listed below:

1. Hidden audio tracks in the table of content (TOC)

This mechanism uses multiple sessions. A first session contains audio tracks, which are marked as digital tracks in the TOC. The second or later session contains a number of virtual audio tracks. Therefore, the CD-ROM drive cannot identify the audio tracks and cannot find the file system in the first session. It only finds the virtual audio tracks in the second or later session. Standard audio CD players do not have any problems with this mechanism, since they only support a single session and will ignore the indication as digital tracks. A standard audio CD player will persist to process any track it encounters as an audio track.

2. Wrong or incomplete file map

A first session contains the audio tracks. A data session is located in a second or later session and pretends an existing file system. The CD-ROM drive is trapped in this second or later session upon trying to parse a wrong or incomplete file map. This mechanism does not disturb a standard audio CD player either, since the first session is correct and the player will ignore any further session.

3. Noise insertion by emulation of missing frames

The absolute and/or relative time in the Q sub-channel is modified in regular intervals to emulate missing frames. The CD-ROM drive will try to retrieve the missing frames to assure the integrity of the output data stream. As a result, the drive will either abort this operation due to excessive reading errors (C2 error) or the data output will be interrupted or chopped up into discontinuous pieces. A standard audio CD player will simply ignore the missing frames.

4. Unrecoverable errors in the audio track

Unrecoverable errors are inserted in the audio track by scrambling the error correction code (ECC), by adding defects during the 8-to-14 modulation (EFM), or by inserting artificial fake errors in the audio content (C2 error). This technique decreases the readability of the disc and is based on the fact that CD-ROM drives use a more sophisticated error correction approach than audio CD drives. A standard audio CD player will rather try to hide the errors instead of making too many correction attempts.

5. Unsettling the CD writer

Using inconsistent pre-gap lengths and leaving index marks in unexpected positions will unsettle many CD writers. Moreover, modifying the TOC in a second or later session to indicate a full data size larger than the available disc capacity, for example 900 MB, will further unsettle many CD writers and keep them from making a digital copy.

The following table shows a summary of existing copy protection methods with the regions of a disc, to which they can be applied. Furthermore, the type of error caused by the copy protection methods and the potential impact on the sound quality is also shown.

In the table, the protection types in the last column and their effect on playback by a CD-ROM drive can be explained as follows.

Track copy protection (usually mechanism 4): Each track has to be protected individually. The tracks can be played back by any CD-ROM drive (in CDDA mode) since the TOC in the lead-in area allows to precisely determine the disc type as CDDA.

Quality copy protection (usually mechanism 3): The tracks can be copied but their quality is decreased. The sound will comprise random pauses or any other interruptions, or will be discontinuous. Similar to the track copy protection, the tracks can be played back by any CD-ROM drive (in CDDA mode) since the disc type can be determined as CDDA.

Disc copy protection (usually mechanisms 1, 2, 5): The whole disc is protected against copying. However, it cannot be played back in a CD-ROM drive since the TOC does not allow to determine the disc type as CDDA.

therefore, be desirable to operate a CD-ROM drive in an audio drive mode. For this purpose, however, the format of an optical disc inserted in the CD-ROM drive has to be securely determined.

JP 10 124 978 discloses a method and an apparatus, which allow to discriminate whether a specific track of a CD-ROM is a data track or in fact an audio track conforming to the CDDA format. This discrimination enables a multi-format disc player to reproduce audio tracks stored on the CD-ROM while at the same time preventing the erroneous reproduction of data tracks stored on the CD-ROM. The discrimination between both types of tracks is based on additional four-bit control attributes for each track, which are included in the table of contents (TOC) of the disc, indicating if a track is a data track or an audio track. This additional attributes are evaluated by an information class distinction means before starting reproduction of the tracks, and only audio tracks are reproduced. The disclosed method has the disadvantage that

|  |  | 1st session | | | Later session(s) | | | Remarks | | |
|---|---|---|---|---|---|---|---|---|---|---|
| Regions in disc | Mechanism | Lead-in Area | Audio Track | Lead-out Area | Lead-in Area | Program Area/ Audio Track | Lead-out Area | Effect | Potential sound quality impact | Protection Type |
| 1st session | Mix content TOC | X |  |  |  |  |  | Hide audio | No | Disc |
|  | Wrong Index number |  | X |  |  |  |  | Unsettle | No | Track |
|  | Extra frame(noise) |  | X |  |  |  |  | C2 error | No | Track |
|  | EFM error |  | X | X |  |  |  | C2 error | Yes | Track |
|  | Scramble ECC |  | X | X |  |  |  | C2 error | Yes | Track |
|  | Pre-gap length |  | X |  |  |  |  | Unsettle | No | Quality |
|  | Shuffle audio and data | X | X | X |  |  |  | Hide audio | No | Quality |
|  | Absolute time |  | X | X |  |  |  | Unsettle | No | Quality |
|  | Relative time | X | X | X |  |  |  | Unsettle | No | Quality |
| Later session(s) | Incorrect TOC |  |  |  | X |  |  | Unsettle | No | Disc |
|  | Incorrect file map |  |  |  |  | X |  | Unsettle | No | Disc |
|  | Extra frame(noise) |  |  |  |  | X |  | C2 error | No | Disc |
|  | EFM error |  |  |  | X | X | X | C2 error | No | Disc |
|  | Scramble ECC |  |  |  |  | X | X | C2 error | No | Disc |
|  | Pre-gap length |  |  |  |  | X |  | Unsettle | No | Disc |
|  | Shuffle audio and data |  |  |  | X | X | X | Hide audio | No | Disc |
|  | Virtual audio/data |  |  |  | X |  |  | Unsettle | No | Disc |
|  | Over 99 audio tracks |  |  |  | X |  |  | Unsettle | No | Disc |
|  | Point 1$^{st}$ session track |  |  |  | X |  |  | Unsettle | No | Disc |
|  | Shorter than actual |  |  |  | X |  |  | Unsettle | No | Disc |
|  | Absolute time |  |  |  | X | X | X | Unsettle | No | Disc |
|  | Relative time |  |  |  | X | X | X | Unsettle | No | Disc |

Predictably, the copy protection mechanisms are not limited to the existing known approaches. A large number of further mechanisms may be developed. However, the copy protection mechanisms must not disturb playback of the audio CDs in standard audio CD players. Therefore, they cannot violate the red book standard too much and exceed the tolerances of a standard audio CD player. For this reason the copy protection mechanisms only make a few modifications to the lead-in area of the first session, as can be seen from the above table. In addition, the mechanisms must also meet market requirements. Consumers will not accept a degradation of the sound quality or a data track before the audio tracks in a single session CD, which could be used to trap a CD drive, but which would be played back as a short mute track by a standard audio CD player. In an alternative approach, a copy protection mechanism could be based on combining a plurality of audio tracks in a single track, and using indices instead of tracks for random access. However, many audio CD players, especially low-end players, do not support index play.

As described in the list of copy protection mechanisms, most problems do not occur with audio drives. It would, if the information in the TOC is partially incorrect due to copy protection measures, discrimination between audio tracks and data tracks might fail and some audio tracks might not be reproduced.

It is, therefore, an object of the present invention to propose a method for determining the format of an optical recording medium comprising one or more data, audio and/or video tracks in one or more sessions, which is robust against partially incorrect data on the recording medium. It is another object of the present invention to propose an apparatus for reading from and/or writing to optical recording media using such method.

SUMMARY OF THE INVENTION

According to the invention, this object is achieved by a method comprising the steps of:

reading the table of contents of a first session of the recording medium;

checking whether more than one track is present in the first session and/or whether at least one track is indicated as being an audio track in the table of contents; and determining the format of the recording medium to be audio if at least one of the checking steps yields a positive result, and determining the format to be data else.

Assuming that all tracks are audio tracks if data tracks and audio tracks are found on a disc simulates the behaviour of a standard audio CD drive, which will play each track irrespective of the audio or data indication in the TOC. Since, however, all audio tracks on a copy protected disc could be incorrectly classified in the TOC, the CD-ROM drive in an audio system cannot solely rely on the track type indication in the TOC of the lead-in area. Commercial audio CDs are seldom published with the single audio track. Therefore, the number of tracks is used to determine if a disc is an audio disc or a data disc. If the disc contains more than one track, it is assumed to be an audio disc. Otherwise, it is assumed to be a data disc. A data disc may, for example, contain compressed and/or uncompressed audio files.

Favourably, the method further comprises the steps of:

checking whether the recording medium comprises more than one session;

performing said steps of checking for the number of tracks and/or audio tracks and said determining steps only if the recording medium comprises more than one session; and relying on the original information contained in the table of contents for determining the format of the recording medium else.

Checking for multi-session allows to extend the inventive method to audio-video products. Otherwise mixed content discs could not be supported. Since most commercially successful copy protection mechanisms use multi-session discs for copy protection, only for these discs it is necessary to check for audio content. A single-session disc can be safely assumed to contain correct and unmodified data in the TOC.

Advantageously, the method additionally comprises the step of enabling a user to force said steps of checking for the number of tracks and/or audio tracks and said determining steps independently of the result of the step checking whether the recording medium comprises more than one session. This allows a user to intervene in case a drive cannot automatically detect the disc type for some reason. This might, for example, be the case for a copy protection mechanism not using a multi-session approach.

According to the invention, the checking steps are based on data in the table of contents, which must not be altered to ensure compatibility with standard audio format players. This is advantageous since future copy protection mechanisms will not alter these data. The method will, therefore, not be circumvented by future copy protection mechanisms.

Favourably, the data in the table of contents used for the checking steps comprises address data and pointer data. These are essential data for any standard audio CD player.

Advantageously, sessions other than the first session are suppressed in case the format of the recording medium is determined to be audio. In this way a CD-ROM drive behaves exactly like a standard audio CD drive, which only supports a single session on a disc. Since some discs contain data tracks in a second or later session, these tracks would otherwise be played back, but without sound. This would hardly meet user demands.

According to the invention, the data in the table of contents are adapted to values corresponding to the determined format of the recording medium. This allows to correct data in the TOC, which has been modified by a copy protection mechanism. Furthermore, the corrected TOC can simply be processed by a standard servo controller. No modifications need to be made to the servo controller, which reduces cost for implementing the inventive method.

The data adapted to values corresponding to the determined format of the recording medium favourably comprise control bits and/or address data. These are the data which are most likely modified by a copy protection mechanism. If these data were not corrected, the incorrect data could unsettle a standard servo controller.

A method according to the invention is advantageously performed by a disc format determination module for determining the format of an optical recording medium comprising a table of contents and one or more tracks. The disc format determination module is favorably implemented as a software solution, however, a hardware solution can also be used.

Favourably, the disc format determination module is interposed in the communication between an optical reading unit and a servo controller module. This allows to reduce the cost for implementing the inventive method, since a standard servo controller module can be used, while all necessary additional processing is performed by the disc format determination module. It is, of course, also possible to integrate the disc format determination module and the servo controller module into a single module.

According to another aspect of the invention, an apparatus for reading from and/or writing to optical recording media, performs a method according to the invention and/or comprises a disc format determination module according to the invention for determining the format of an inserted recording medium. Such an apparatus has the advantage that it is capable of reproducing various types of disc formats including discs containing compressed and/or uncompressed audio files, without being disturbed by copy protection mechanisms.

BRIEF DESCRIPTION OF THE DRAWINGS

For a better understanding of the invention, exemplary embodiments are specified in the following description of advantageous configurations with reference to the figures. It is understood that the invention is not limited to these exemplary embodiments and that specified features can also expediently be combined and/or modified without departing from the scope of the present invention. In the figures.

DETAILED DESCRIPTION OF PREFERRED EMBODIMENTS

Figure 1:
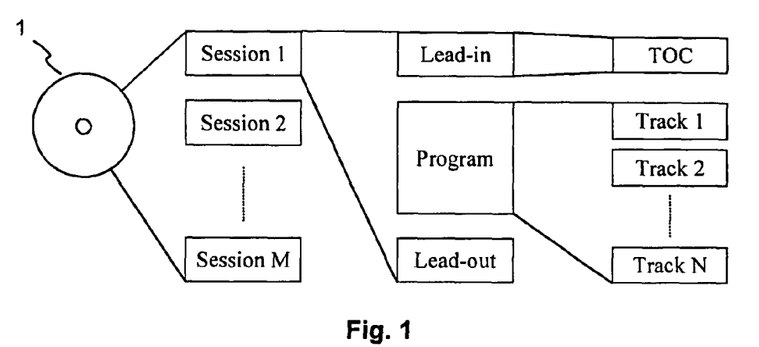
FIG. 1 shows a typical CD data layout.

FIG. 1 shows a typical CD data layout. An optical recording medium 1 usually can have one or more sessions. Each session comprises a lead-in, program and lead-out area. The program area contains one or more tracks that can be audio tracks or data tracks. Along the disc, sub-channels (subcodes) are embedded in each area (lead-in, program and lead-out). The table of contents (TOC) is the Q sub-channel located in the lead-in area and contains information about the contents of the session, such as the number of tracks and their attributes and locations.

Figure 2:
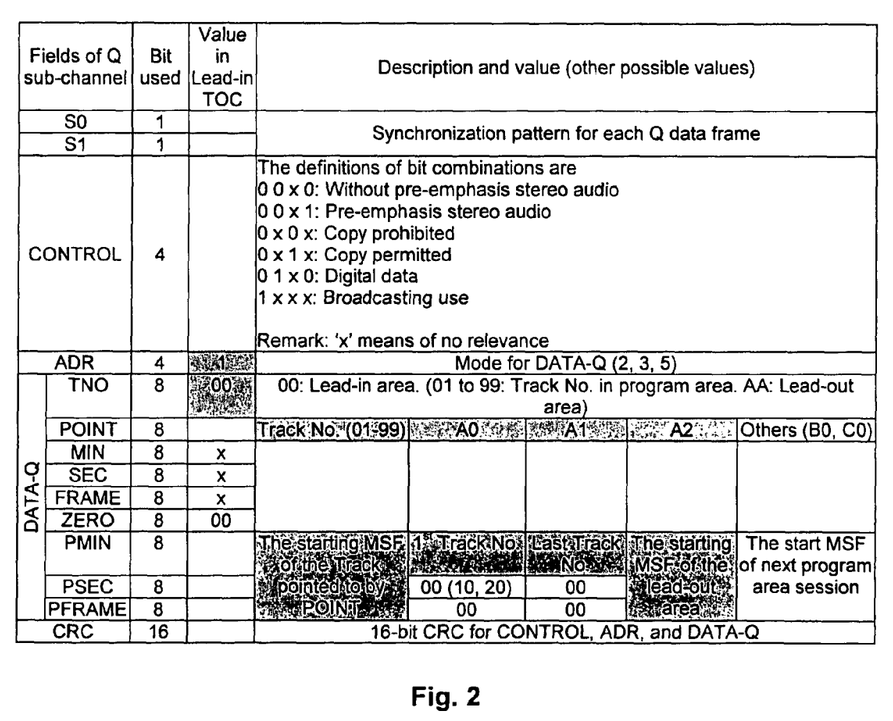
FIG. 2 shows the fields of the Q sub-channel code in the lead-in and their possible values.

FIG. 2 shows the fields of the Q sub-channel code in the lead-in area of a session. Each Q sub-channel code starts with two sync-patterns S0 and S1 as the first two symbols. The next four data bits CONTROL are control bits and define the content of a track, i.e. audio or data and may also contain information about copy protection. The control bits CONTROL are followed by address information ADR specifying one of four modes for the Q data bits DATA-Q. The Q data bits DATA-Q are contained in a Q data block comprising 72 bits subsequent to the address bit ADR. The Q sub-channel code ends with 16 CRC bits used for cyclic redundancy check of the control CONTROL, address ADR and Q data bits DATA-Q. In the lead-in TOC, the address bit ADR has a value "1" indicating that the Q data block DATA-Q contains information about the TOC. Other possible values for the address bit ADR are "2" (Q data block DATA-Q contains a catalogue number), "3" (Q data block DATA-Q contains international standard recording (ISR) code), or "5" (indicating multi-session). Each Q data block DATA-Q of a Q sub-channel code in the TOC contains a pointer POINT, pointing to one of the available tracks or the lead-out area, or indicating the first or last track. In addition, the Q data block contains the starting minute, second and frame (MSF) of the track pointed to by the pointer. In case of a multi-session disc, the pointer POINT may further indicate the starting minute, second and frame of the next session.

The TOC items, which are packed into the Q sub-channel shown in FIG. 2, are repeated three times each in successive Q sub-channel code blocks. The whole TOC is continuously repeated during the lead-in area of a session. As for multi-session with POINT equal to "others" and ADR equal to "5", it will additionally occur at about half frequency and is interleaved in the original Red Book layout. Each sub-channel code is also successively repeated three times. In FIG. 2, some fields of the Q sub-channel code are shaded in grey. These fields contain the minimum necessary data in the lead-in TOC for a standard audio CD player. In other words, these essential data must be correct to allow playback of an audio CD by a standard audio CD player. Therefore, copy protection mechanisms must not alter these data.

Figure 3:
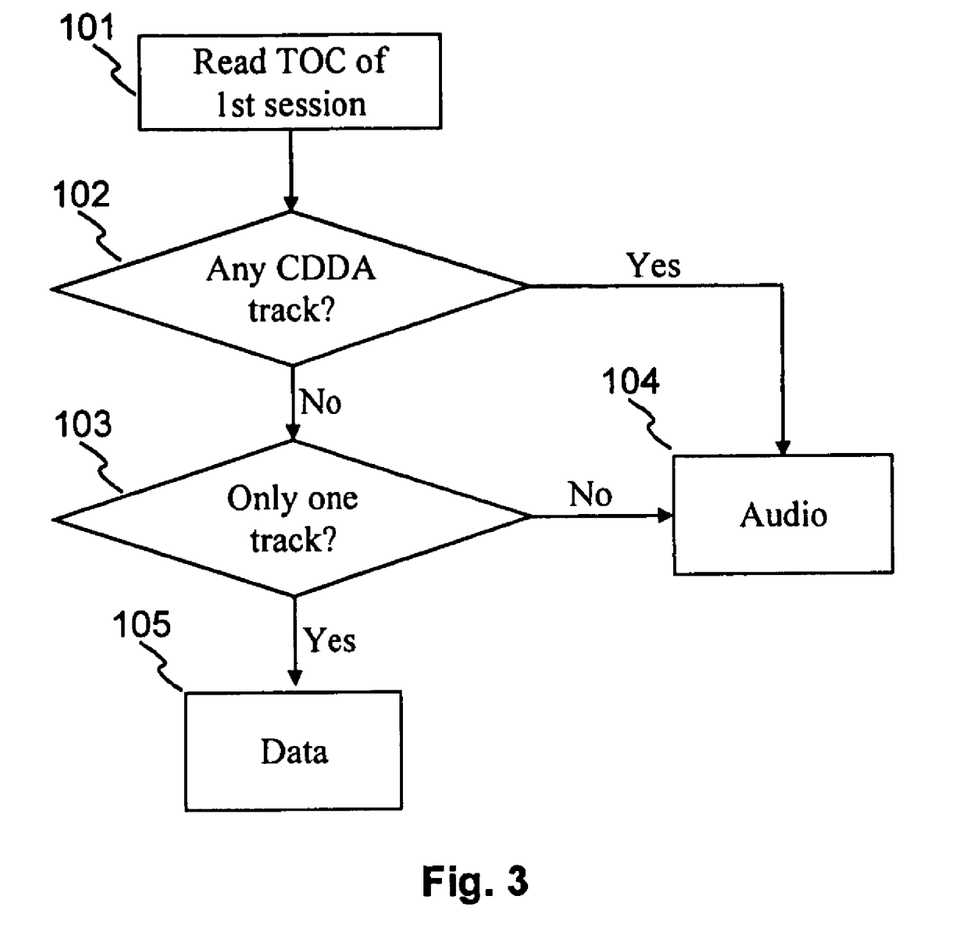
FIG. 3 shows a method according to the invention applicable to audio products.

FIG. 3 shows a method according to the invention applicable to audio products. In a step 101 the TOC of the first session on a disc is read. A first checking step 102 analyses if any of the tracks found in the TOC is indicated as an audio track (CDDA). This information can be derived from the control bits. If the first checking step 102 reveals an audio track, in a conclusion step 104 all tracks of the first session of the disc are processed like audio tracks, irrespective of the control bits. The disc is assumed to be an audio disc and possible further sessions on the disc are ignored. If the first checking step 102, however, does not reveal any audio track, a second checking step 103 is performed. In this step 103 the number of tracks is determined using, for example, the POINT information. If more than one track is present, the disc is assumed to be an audio disc as before in the conclusion step 104 and all tracks are processed like audio tracks. Possible further-sessions on the disc are ignored. If, however, only a single track is present, in a step 105 the disc is handled like a data disc and all sessions and tracks on the disc are processed accordingly. In this context, data comprises compressed and uncompressed audio files. Of course, the order of the first and the second checking steps 102, 103 can also be reversed.

Standard audio CD players support only a single session on a disc, i.e. if a disc contains more than one session, only the tracks in the first session will be reproduced. Therefore, in all commercial audio CDs the audio tracks are put into a single session. If any of the tracks is actually a data track or any other non-audio track, a standard audio CD player will play back this track anyway, but without sound. If the same capability is requested of a multi-format disc player using a CD-ROM drive, such a player has to ignore any further sessions on a disc if the first session contains audio tracks. This is achieved by the first checking step 102. The behaviour is different from the behaviour of a standard CD-ROM drive, which tries to analyse the data content in all sessions. In other words, the standard CD-ROM drive works in a data mode while the CD-ROM drive in the audio system works in an audio mode when a disc has both audio and data content.

While the TOC of the lead-in area indicates all track locations in the first session, the track type, which is actually audio track, may be incorrectly indicated as data track on a copy protected audio CD in order to hide the audio tracks in the first session. As explained before, a standard audio CD player will play each track irrespective of the audio or data indication in the TOC. Therefore, the copy protected audio tracks can be played back correctly by a standard audio CD player, but a standard CD-ROM drive will try to parse the file system in a first faked data track instead. Since all audio tracks on a copy protected disc could be incorrectly classified in the TOC, the CD-ROM drive in an audio system cannot solely rely on the track type indication in the TOC of the lead-in area. Commercial audio CDs are seldom published with the single audio track. Although all songs can be recorded in a single track and accessed by an index, most standard audio CD players do not support index search, especially the low-end players. Therefore, in the second checking step 103 the number of tracks in the first session is used to determine if a disc is an audio disc or a data disc. If the disc contains more than one track, it is assumed to be an audio disc. Otherwise, it is assumed to be a data disc.

Figure 4:
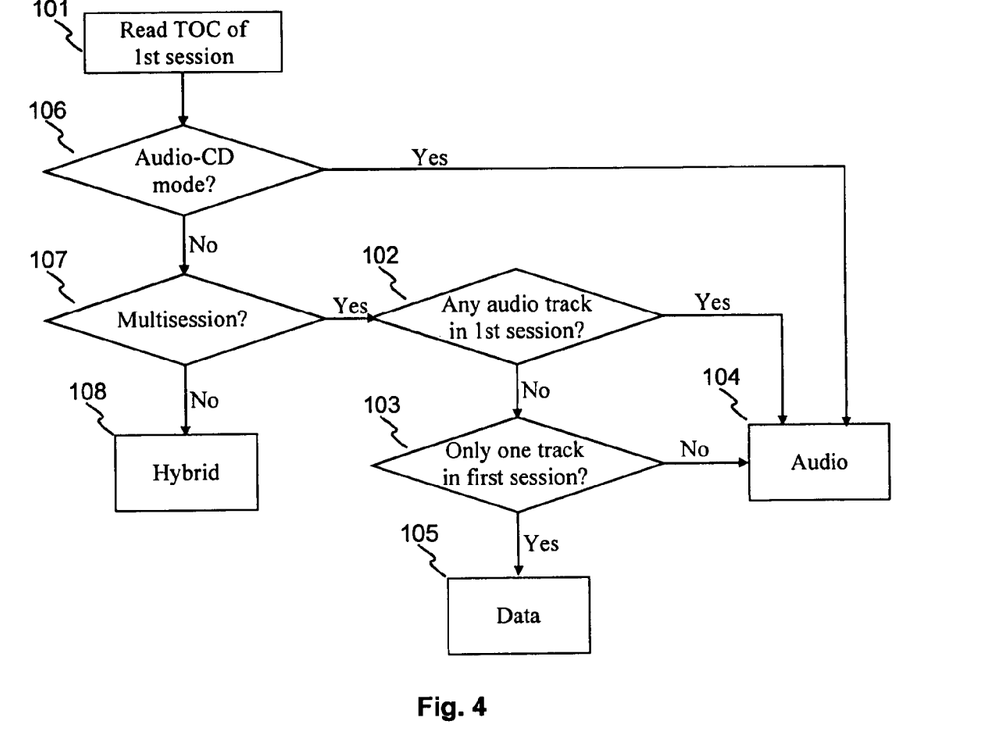
FIG. 4 shows a method according to the invention applicable to audio-video products.

In FIG. 4 a method according to the invention applicable to an audio-video product is shown. While the method shown in FIG. 3 easily and quickly allows to determine the type of disc in an audio product by detecting audio tracks or the number of tracks in the lead-in TOC of the first session, the method does not support data tracks on a mixed content disc. These discs are mainly available in the audio-video market and are mostly single session discs (VCD, AVCD, . . . ), except for the Enhanced CD, which has a second session for PC applications. While the steps 101 to 105 correspond to the steps shown in FIG. 3, the method is modified and enhanced to support mixed content discs. For this purpose a third checking step 107 is introduced, checking whether the disc is a multi-session disc. If this is not the case, in a conclusion step 108 the disc is processed as a hybrid disc and all contents in the single session are reproduced. The hybrid disc may contain data, video, audio or a partial combination of the above. For determining the specific type of disc (CDDA, VCD, AVCD, etc.) the audio video product will in this case rely on the information contained in the TOC. It is assumed that this information has not been altered by a copy protection mechanism. Though a copy protection mechanism can add a fake file system in the first data track of a single session disc to unsettle the CD-ROM drive, this approach will hardly lead to user satisfaction since it creates a short mute track in a standard audio CD player. Such a copy protection mechanism would, therefore, be unsuccessful on the market. Despite of this, an "Audio-CD mode"-switch can be added to the audio-video product allowing a user to force the CD-ROM drive into audio CD mode just in case it cannot automatically detect the disc type. For this purpose, a fourth checking step 106 is added checking for "Audio CD mode" and forcing audio playback if this mode is switched on. Optionally, the fourth checking step 106 can be moved just in front of the conclusion step 108 to implement a semi-automatic disc detection. This is especially useful in a multi-disc system allowing to hold different types of discs at the same time.

If the third checking step 107 yields a multi-session disc, the steps 102 to 105 as in FIG. 3 are performed. In case of an Enhanced CD, which is a multi-session disc, this disc will be correctly reproduced, i.e. only the audio tracks contained in the first session will be played back.

The approach shown in FIG. 4 relies on the fact that all commercially successful copy protection mechanisms use multi-session discs for copy protection.

Figure 5:
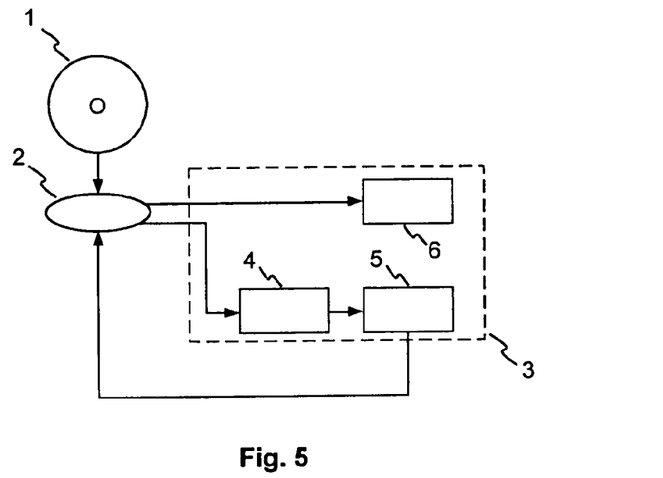
FIG. 5 schematically shows the an apparatus for reading from and/or writing to optical recording media using the inventive method.

In FIG. 5 an apparatus for reading from and/or writing to optical recording media using a method according to the invention in is shown schematically. The apparatus comprises a reading unit 2 for reading information from an optical recording medium 1, and a processor 3 for processing this information. The processor 3 comprises a data processing module 6, which receives the main data from the reading unit 2, a servo control module 5 for controlling the reading unit 2, and a disc type determination module 4 for determining the disc type. The disc type determination module 4 is implemented as a Q sub-channel sequential filter. The Q sub-channel sequential filter 4 processes Q sub-channel data received from the reading unit 2 and corrects incorrect data caused by copy protection mechanisms, where necessary. The servo control module 5 has full capability of determining the disc type itself in case the information contained in the Q sub-channel is correct. Therefore, in the conclusion step 108 of FIG. 4 no further discrimination between different disc types is necessary. The approach has the advantage that it can be easily implemented by simply adding the disc type determination module 4 in the communication between the reading unit 2 and the servo control module 5. The original servo control module 5 does not have to be modified in any way.

Figure 6:
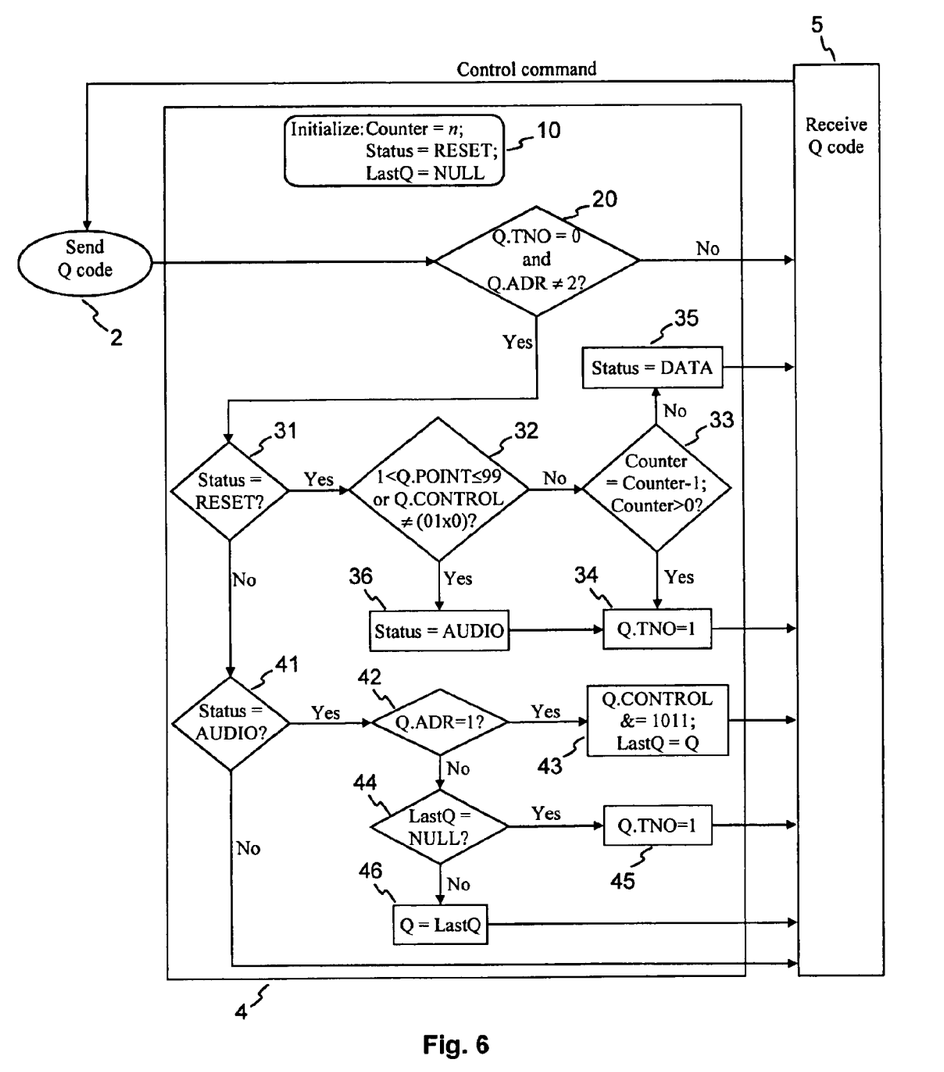
FIG. 6 depicts the implementation of the inventive method as a Q sub-channel sequential filter for an audio product.

FIG. 6 shows the implementation of a Q sub-channel sequential filter 4 for an audio product. The sequential filter 4 makes use of the integrity of the shaded fields of the TOC shown in FIG. 2. The feasibility of the sequential filter 4 is mainly based on two properties of the servo control module 5 implementation, namely an interactive control based on Q sub-channel codes and a retrial mechanism for loss or error data. These two properties are used during the initial state of the sequential filter to determine the disc type and its layout.

After a disc 1 is inserted in the disc drive, in a step 10 the local parameters of the sequential filter 4 are initialised, where "Counter" is the number of retries to retrieve the lead-in TOC to determine the disc type, "Status" is to store the disc type, and "LastQ" is a buffer to store the last Q sub-channel code frame. Upon a control command from the servo control module 5, the reading unit 2 sends a Q code frame to the sequential filter 4. In an entry step 20 it is checked whether the Q code frame belongs to the lead-in TOC using the values Q.TNO and Q.ADR. If this is the case, filtering continues. Otherwise, the Q code frame is skipped and passed to the servo control module 5. Q.TNO is the TNO field of the Q sub-channel code; a similar representation for all fields is used in the figure and throughout the following description. If the entry step 20 yields a Q code frame belonging to the lead-in TOC, a checking step 31 checks if Status is "RESET". If it is, the function continues with the checking step 32; otherwise, it continues with the checking step 41. The checking step 32 analyses whether more than one track is present or if a track has non-digital content. In either case, in a step 36 Status is set to "AUDIO". The filtering then continues with a step 34 changing Q.TNO from "0" to "1" to make the servo control module 5 believe that it has got a wrong track number, e.g. track 1, in order to let it relocate the current track to "0" again. This processing simulates a random choice to retrieve another Q code frame from the lead-in TOC to improve reliability. Following step 34, the function returns to step 20 and waits for another Q code frame. If in the checking step 32 neither of the conditions is fulfilled, in a step 33 the number of retrials is decremented by "1" and checked. If the maximum number of retrials is not yet reached, the above described step 34 follows. Otherwise, in a step 35 Status is set to "DATA" and the function continues with step 20, waiting for another Q code frame.

If in the checking step 31 Status is not "RESET", in the checking step 41 it is analysed if the Status is "AUDIO". If this is not the case, the Q code frame is simply passed to the servo control module 5 and the function continues with step 20 waiting for another Q code frame. If, however, Status is "AUDIO", a further step 42 checks whether the Q code frame is mode 1, i.e. if Q.ADR is equal to "1". If it is, in a step 43 the control bits Q.CONTROL of the Q code frame are set to indicate audio and the corrected Q code frame is backed up, i.e. the corrected Q code frame is written to the buffer LastQ. The corrected Q code frame is then passed to the servo control module 5 and the function returns to step 20 waiting for another Q code frame.

In case in the step 42 the Q code frame is not mode 1, a step 44 checks whether the LastQ buffer is not yet initialised. If it is not initialised, in a step 45 similar to step 34 Q.TNO is changed from "0" to "1" to retrieve another Q code frame and the function returns to step 20 waiting for another Q code frame. If, however, the step 44 returns that the LastQ buffer is already initialised, in a step 46 the current Q code frame is replaced with a LastQ value to mask out non-audio content, e.g. multi-session, and passed to the servo control module 5. The function then continues with step 20 waiting for another Q code frame.

The detailed description of the implementation can be summarized as follows. For each Q code frame it is checked whether it belongs to the lead-in TOC or not. If it doesn't, it is simply passed to the servo control module 5. If, however, the Q code frame belongs to the lead-in TOC, it is submitted to further processing. Step 31 checks whether the disc type has already been determined. If this is not the case, in the steps 32 to 36 the sequential filter tries to determine the disc type. The result will either be "AUDIO" or "RESET". In either case, the servo control module 5 relocates the current track to "0" again to retrieve another Q code frame. If the steps 32 to 36 did not reveal an audio disc, i.e. the status is still "RESET", these steps are repeated with the next Q code frame. Only if a predetermined number "n" of unsuccessful attempts has been made to determine an audio disc, the status will be set to "DATA". The following Q code frames will then simply be passed to the servo control module 5 through the steps 20, 31 and 41. If, however, an audio disc was determined, the steps 41 to 46 make sure that for all following Q code frames of the lead-in TOC the control bits are set to indicate "audio" and the mode is set to "1".

Figure 7:
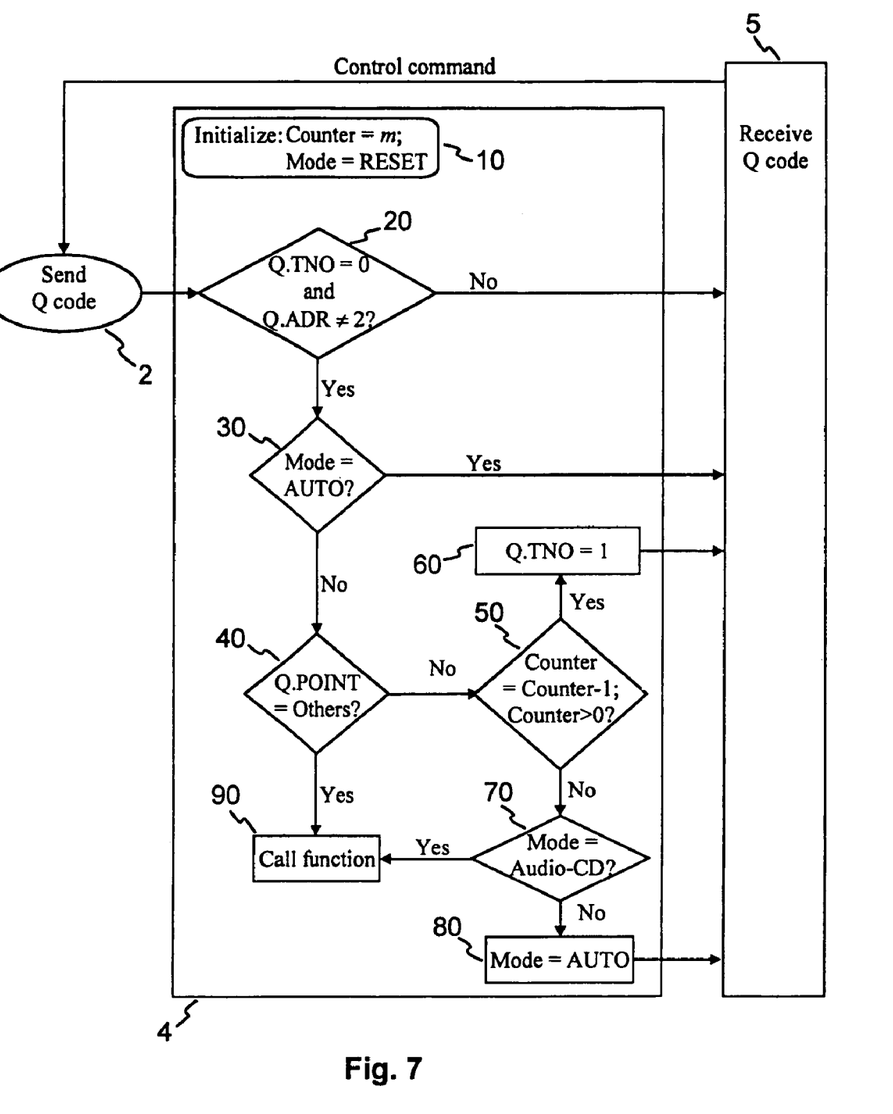
FIG. 7 depicts the Q sub-channel sequential filter for an audio-video product.

In FIG. 7 an extended implementation of the Q sub-channel sequential filter 4 for an audio-video product is shown. In the figure the optional approach mentioned with regard to FIG. 4 is realised, i.e. the semi-automatic disc detection. As before in FIG. 6, in the step 10 the local parameters of the sequential filter 4 are initialised, where "Counter" is an additional counter determining the number of retries to retrieve the lead-in TOC to determine if the disc is multi-session, and "Mode" is to record the user mode. Mode can assume the values "AUTO", "RESET", and "Audio-CD". In case of "AUTO", the servo control module 5 relies on the information contained in the TOC. It is assumed that this information has not been altered by a copy protection mechanism. "Audio-CD" forces the sequential filter 4 to perform the steps 31-46 shown in FIG. 6. While step 20, as before, checks whether the Q code frame belongs to the lead-in TOC, step 30 checks if the mode has been set to "AUTO". In this case, the Q code frame is simply passed to the servo control module 5. Otherwise, in step 40 it is checked whether the disc is a multi-session disc. If it is, in a step 90 the function of FIG. 6 is called. If the disc is not multi-session, the step 50 decrements the counter by "1" and checks whether the predetermined number of retries has already been reached. If the predetermined number has not yet been reached, in a step 60 Q.TNO is changed from "0" to "1" to let the servo control module 5 relocate the current track to "0" again. The function then returns to step 20 waiting for another Q code frame. If, however, the predetermined number of retries has already been reached, step 70 checks if the user has switched the mode to "Audio-CD". In this case in the step 90 the function shown in FIG. 6 is called, which will perform the above described audio CD determination. Otherwise, in step 80 the mode is set to "AUTO" and the Q code frame will simply be passed to the servo control module 5.

What is claimed is:

1. Method for determining the format of an optical recording medium comprising one or more sessions, each session comprising a table of contents and one or more tracks, the method comprising the steps of:
   reading the table of contents of a first session of the recording medium;
   checking whether more than one track is present in the first session; and
   determining the format of the recording medium to be audio if the checking step yields a positive result, and determining the format to be data else.

2. Method according to claim 1, further comprising the steps of:
   checking whether at least one track is indicated as being an audio track in the table of contents; and
   determining the format of the recording medium to be audio if the checking step yields in a positive result irrespective of the result of checking whether more than one track is present.

3. Method according to claim 2, further comprising the steps of:
   checking whether the recording medium comprises more than one session;
   performing said steps of checking for the number of tracks, the presence of an audio track and said determining steps only if the recording medium comprises more than one session; and
   relying on the original information contained in the table of contents for determining the format of the recording medium else.

4. Method according to claim 3, further comprising the step of enabling a user to force said steps of checking for the number of tracks, the presence of an audio track and said determining steps independently of the result of the step of checking whether the recording medium comprises more than one session.

5. Method according to claim 3, wherein the checking steps are based on data in the table of contents, which must not be altered to ensure compatibility with standard audio format players.

6. Method according to claim 5, wherein the data in the table of contents used for the checking steps comprise address data and pointer data.

7. Method according to claim 2, wherein the checking steps are based on data in the table of contents, which must not be altered to ensure compatibility with standard audio format players.

8. Method according to claim 7, wherein the data in the table of contents used for the checking steps comprises address data and pointer data.

9. Method according to claim 2, further comprising the step of suppressing sessions other than the first session in case the format of the recording medium is determined to be audio.

10. Method according to claim 2, further comprising the step of adapting data in the table of contents to values corresponding to the determined format of the recording medium.

11. Method according to claim 10, wherein the data adapted to values corresponding to the determined format of the recording medium comprise control bits and/or address data.

12. Method for determining the format of an optical recording medium comprising one or more sessions, each session comprising a table of contents and at least a first session comprising more than one track, the method comprising the steps of:
   reading the table of contents of the first session of the recording medium;
   checking whether at least one track is indicated as being an audio track in the table of contents; and
   determining the format of the recording medium to be audio if the checking step yields a positive result, and determining the format to be data else.

* * * * *